United States Patent
Hansen et al.

(10) Patent No.: US 6,345,981 B1
(45) Date of Patent: Feb. 12, 2002

(54) CONTROLLED SOLID FUEL THERMOLYSIS IN PREHEATER/PRECALCINER KILNS

(75) Inventors: Eric R. Hansen, Shawnee, KS (US); James R. Tutt, Texarkana, TX (US)

(73) Assignees: Cadence Environmental Energy, Inc., Michigan City, IN (US); Ash Grove Cement Company, Overland Park, KS (US)

(*) Notice: Subject to any disclaimer, the term of this patent is extended or adjusted under 35 U.S.C. 154(b) by 0 days.

(21) Appl. No.: 09/626,651

(22) Filed: Jul. 27, 2000

Related U.S. Application Data

(60) Provisional application No. 60/145,917, filed on Jul. 27, 1999.

(51) Int. Cl.⁷ ............................. F27B 7/02; F27B 15/00
(52) U.S. Cl. ................... 432/106; 432/14; 110/246
(58) Field of Search ..................... 432/14, 15, 58, 432/106, 117; 110/246, 346; 106/745

(56) References Cited

U.S. PATENT DOCUMENTS

| | | |
|---|---|---|
| 4,110,121 A | 8/1978 | Rechmeier et al. |
| 4,295,823 A | 10/1981 | Ogawa et al. |
| 4,419,943 A | 12/1983 | Faurholdt |
| 4,930,965 A | 6/1990 | Peterson et al. |
| 5,098,285 A | 3/1992 | Bauer |
| 5,226,774 A | 7/1993 | Tutt et al. |
| 5,339,751 A | 8/1994 | Tutt |
| 5,544,597 A | 8/1996 | Camacho |
| 5,816,795 A | 10/1998 | Hansen et al. |
| 5,989,017 A | 11/1999 | Evans |

FOREIGN PATENT DOCUMENTS

WO   WO 82/01581   5/1982

*Primary Examiner*—Gregory Wilson
(74) *Attorney, Agent, or Firm*—Barnes & Thornburg

(57) ABSTRACT

A method and apparatus for controlling the combustion of fuel modules charged into a preheater or precalciner kiln above the transition shelf, typically into the riser duct, is described. The apparatus includes a sensor for providing signals indicative of the status in the region of combustion of the fuel modules, and a controller for a fuel module feed mechanism is provided to receive signals indicative of the status of the combustion region and adjust the rate of delivery of the fuel module into the combustion region responsive to the sensed conditions in the combustion region.

21 Claims, 6 Drawing Sheets

CONTROLLED SOLID FUEL THERMOLYSIS IN PREHEATER/PRECALCINER KILNS

CROSS REFERENCE TO RELATED APPLICATIONS

This application claims priority to U.S. provisional application Ser. No. 60/145,917, filed Jul. 27, 1999.

FIELD OF THE INVENTION

This invention relates to a method and apparatus for moderating or controlling the combustion of fuel modules charged into a combustible environment. More specifically, the present invention relates to a method and apparatus for controlling the rate at which fuel modules are charged into the riser duct of a preheater or precalciner kiln.

BACKGROUND AND SUMMARY OF THE INVENTION

This invention relates to a method and apparatus for achieving environmentally sound disposal of combustible solid waste in an operating preheater or precalciner cement kiln. In the widely used commercial process for the production of cement clinker, cement raw materials are calcined and "clinkered" by passing finely divided raw mineral materials through a rotating inclined rotary kiln vessel or kiln cylinder. The requisite temperatures for processing the mineral material are achieved by burning fuel such as gas, fuel oil, powdered coal and the like at the lower end of the kiln with the kiln gases moving countercurrent to the mineral materials moving through the rotating kiln cylinder.

Preheater and precalciner cement kilns are well known in the art and a description of their operation may be found in U.S. Pat. No. 5,816,795 to Hansen et al ("the '795 patent") that is incorporated by reference herein. Preheater or precalciner kilns have, in addition to an inclined rotating kiln vessel fired at its lower end, a stationary heat transfer portion at its upper end (typically including multistage cyclones) for preheating and/or precalcining the mineral material before it is introduced into the upper end of the rotating kiln vessel. Because the mineral material is preheated or precalcined before entering the rotating kiln vessel, the length of the rotating kiln vessel can be much shorter than the rotary vessel in conventional long kilns. The present invention provides a method and apparatus for controlled environmentally sound, highly efficient burning of solid combustible wastes as supplemental fuel in the stationary heat transfer portion of preheater or precalciner kilns.

In accordance with one embodiment of the present invention there is provided an apparatus for delivering solid waste derived supplemental fuel into a preheater or precalciner cement kiln. Such kilns include a riser duct, a rotary vessel, and a shelf transition portion and, in operation, a kiln gas stream comprising combustion products flowing serially from the rotary vessel through the shelf transition portion and into the riser duct. The apparatus comprises a supplemental fuel delivery port in the riser duct spaced apart downstream, relative to kiln gas flow, from the transition shelf portion. Communicating with the fuel delivery port is a fuel delivery tube having a fuel inlet end external to the riser duct and a fuel outlet end spaced apart from the inlet end. A solid fuel feed mechanism is provided for advancing solid fuel elements through the fuel delivery tube and the fuel delivery port and into a supplemental fuel combustion region. The improvement of the invention comprises a controller for the fuel feed mechanism for adjusting the rate of advancement of the solid fuel element through the fuel delivery port and into contact with the kiln gas stream in a supplemental fuel combustion zone.

In one embodiment the apparatus further comprises a sensor in contact with the kiln gas stream and in communication electrically or telemetrically with a controller for providing signals indicative of combustion efficiency in the kiln. In one embodiment the sensor provides a signal indicative of the concentration of a gaseous component of the kiln gas stream. The controller can be programmed to increase the rate of advancement of the solid fuel element through the fuel delivery port in response to sensed increases in oxygen or nitrogen oxide concentration in the kiln gas stream, and to decrease the rate of advancement of the solid fuel element through the fuel delivery port in response to sensed increases in carbon monoxide or hydrocarbon concentration in the kiln gas stream.

The apparatus is preferably free of any supports of the fuel module in the riser duct. Optionally the apparatus can include a meal/dust delivery port in the riser duct independent of the fuel delivery port and a blower for dispersing meal or kiln dust into the kiln gas stream into or in the vicinity of the supplemental fuel combustion zone or region. Another aspect of the present invention is the optimization of the use of supplemental fuel in preheater/precalciner kilns with minimal impact on effluent kiln gas quality. The method comprises the steps of modifying a preheater or precalciner kiln to include the improved apparatus outlined in the aforestated embodiments and operating the kiln to minimize concentrations of carbon monoxide, hydrocarbons and nitrogen oxides in the effluent kiln gas stream.

Another embodiment of the present invention provides a method for controlling the feed rate of a fuel module into a combustion region, including the steps of determining the status of the combustion region, for example, gas composition or temperature, determining or programming the physical characteristics of the fuel module, and controlling the feed rate of the fuel module into the kiln as a function of the determined status of the combustion region and the fuel module characteristics. In one embodiment of the invention the determination of the status of the combustion region includes measuring the oxygen level in the combustion region or at a kiln gas downstream location where oxygen level of the combustion region can be determined indirectly. Alternatively, carbon monoxide levels or temperature levels can be measured to assess the status of the combustion region. downstream of the transition shelf portion. In one aspect of that method the size, shape, density of the fuel module can be measured and programmed into the controller. In one alternative embodiment the method can include the step of feeding a combustion control agent into the combustion region to affect the combustion. The feed rate of the combustion control agent can be monitored, adjusted, and coordinated with the feed rate of the fuel module.

In another embodiment of the invention there is provided a mechanism for feeding fuel modules into a combustion region. The mechanism includes a fuel module feeder, a sensor positioned in communication with the combustion region, and a control means for receiving signals from the sensor and data relevant to the physical characteristics of the fuel module and adjusting the rate at which the fuel module feeder feeds fuel modules into the combustion region responsive to said signals. The mechanism can optionally include a combustion control agent feeder positioned to deliver a combustion control agent into the combustion region to affect combustion of the fuel module in the combustion region. The combustion control agent feeder can be programmed to deliver the control agent to the combustion region at a continuous rate and signals indicative of that rate can be delivered to the fuel module feeder controller and used to set or reset the fuel module feed rate into the combustion region. Alternatively the feed rate of the combustion control agent can be adjusted in conjunction with controlling the rate at which the fuel module feeder delivers fuel modules into the combustion region.

DETAILED DESCRIPTION OF THE INVENTION

Figure 1:
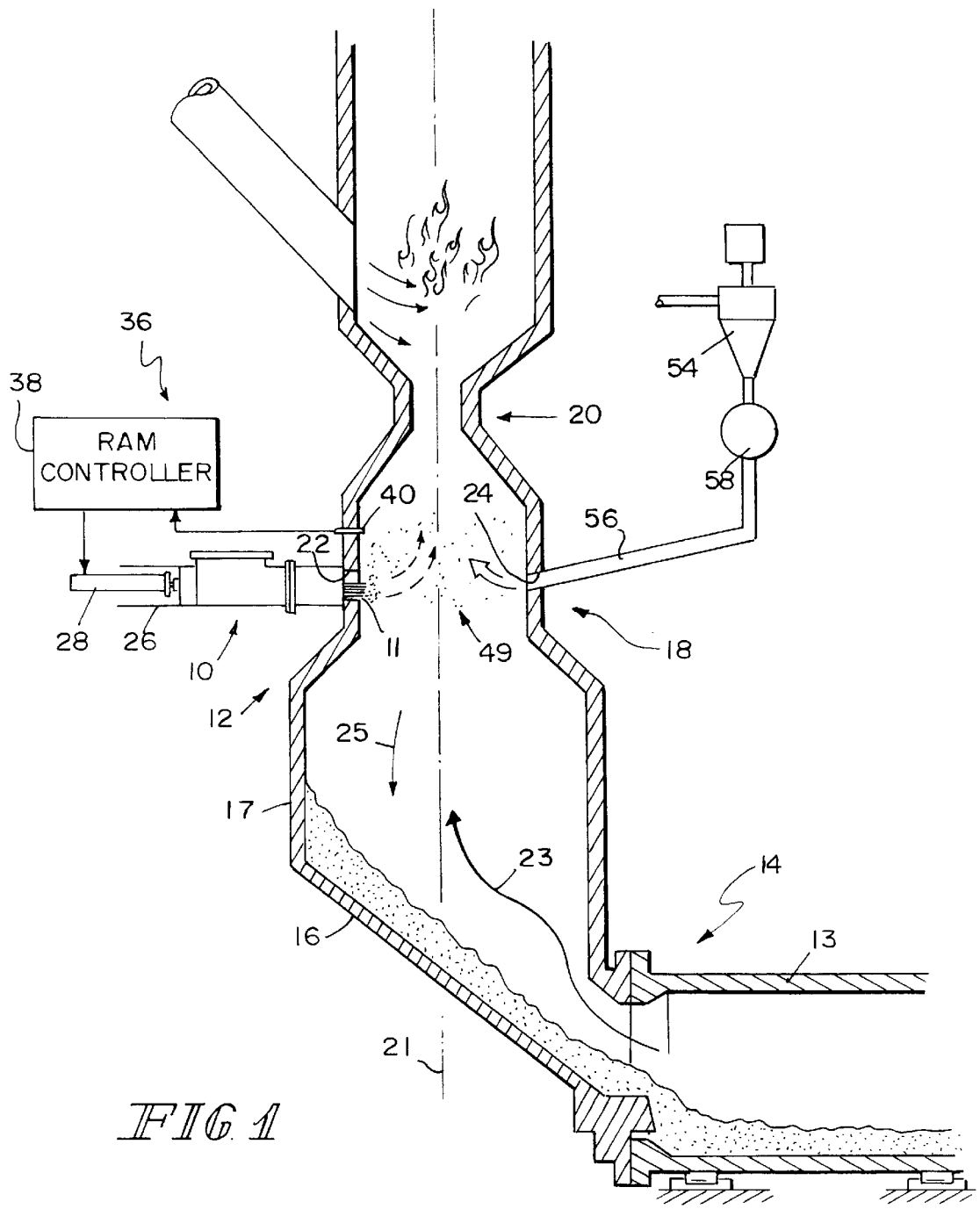
FIG. 1 is a cross-sectional view of a preheater/precalciner kiln showing position of the controlled fuel delivery system in accordance with the invention.

A fuel charging apparatus or fuel feeder 10 is provided to charge combustible waste solids or other fuel modules into a combustion region such as a riser duct 12 of a precalciner or preheater kiln 14 as shown in FIG. 1. The fuel modules may combust or pyrolyze in the combustion region depending on the oxygen concentration in the kiln gas stream at the point of fuel module introduction. Precalciner and preheater kilns 14 include a rotary vessel 13, a riser duct 12, and a shelf-transition portion 16 situated between rotary vessel 13 and riser duct 12. Kiln gases flow serially in direction 23 through rotary vessel 13, shelf-transition portion 16, and riser duct 12. Mineral material flows in direction 25 countercurrent to the kiln gas stream. The mineral material falls through riser duct 12 onto shelf-transition portion 16 and then into and through rotary vessel 13. The heated kiln gas stream flowing upwardly through riser duct 12 in direction 23 heats the mineral material as it falls down through riser duct 12 and in serial cyclones (not shown) downstream relative to kiln gas flow of the riser duct 12. The mineral material is finely crushed to permit good heat transfer between the heated kiln gas stream and the mineral material.

With reference particularly to FIG. 1, riser duct 12 includes a first portion 17 positioned above shelf transition portion 16, a narrowed segment or second portion 18 positioned above first portion 17 and shelf transition portion 16, and an orifice or third portion 20 positioned above narrowed segment 18. The riser duct 12 further includes a longitudinal axis 21 and a fuel inlet 22 and meal inlet 24 in a riser duct wall of narrowed segment 18.

Figure 2:
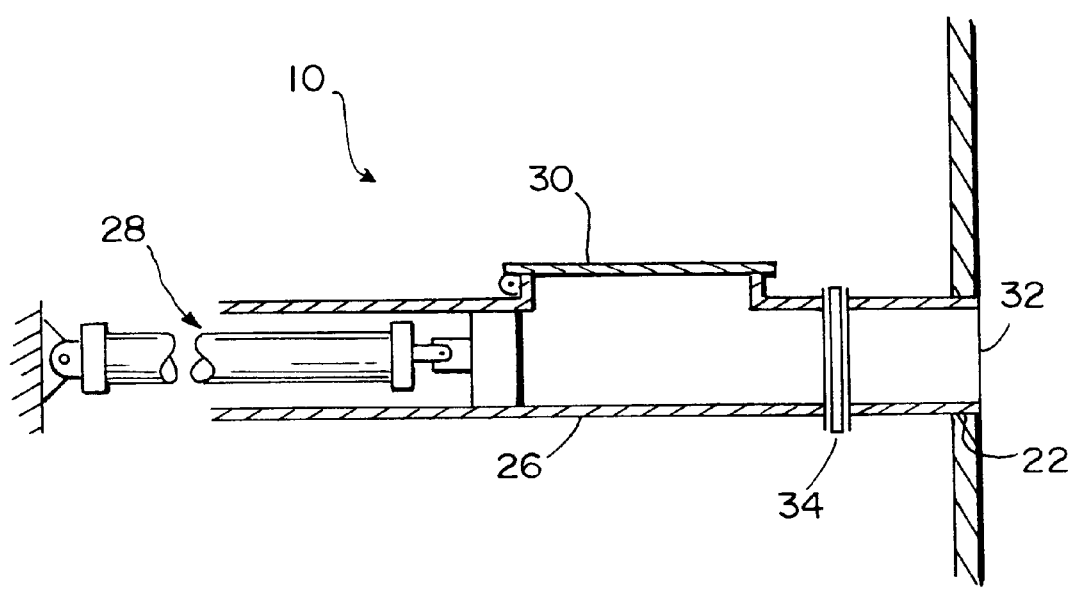
FIG. 2 is a partial cross-sectional view of the fuel feeder.

Fuel charging apparatus 10 includes a housing 26 and a hydraulic ram 28 positioned within housing 26. Housing 26 includes a fuel module inlet 30, a fuel module outlet 32, and a moveable heat shield 34 positioned to fill a cross-section of housing 26 between fuel module inlet 30 and outlet 32. Fuel charging apparatus 10 is positioned so that fuel module outlet 32 is adjacent to riser duct fuel inlet port 22, the two cooperating to form a passageway from fuel module inlet 30 to the interior of narrowed segment 18 for introduction of fuel modules to contact the high temperature kiln gases with subsequent combustion and/or pyrolysis. A fuel module 11 is introduced into fuel module inlet 30 of fuel charging apparatus 10 while hydraulic ram 28 is in a retracted position, as shown in FIG. 2. Once the fuel module rests inside housing 26, hydraulic ram 28 extends to push the fuel module toward fuel module outlet 32 and ultimately through riser duct fuel inlet port 22. As the fuel module 11 is advanced through riser duct fuel inlet port 22, the fuel module 11 is substantially or completely combusted or pyrolyzed by the hot kiln gases as shown in FIG. 1.

In preferred embodiments, a fuel module 11 charged into riser duct 12 from the position of fuel charger apparatus 10 as depicted in FIG. 1 would pyrozlye instead of combusting due to the high temperature and very low oxygen content in the kiln gas at narrowed segment 18. Fuel charging apparatus 10 can be any apparatus that can feed waste materials into kiln riser ducts. The fuel charging apparatus 10 is substantially similar to the fuel charging apparatus disclosed in the Hansen et al. '795 patent which is incorporated herein by reference.

Figure 3:
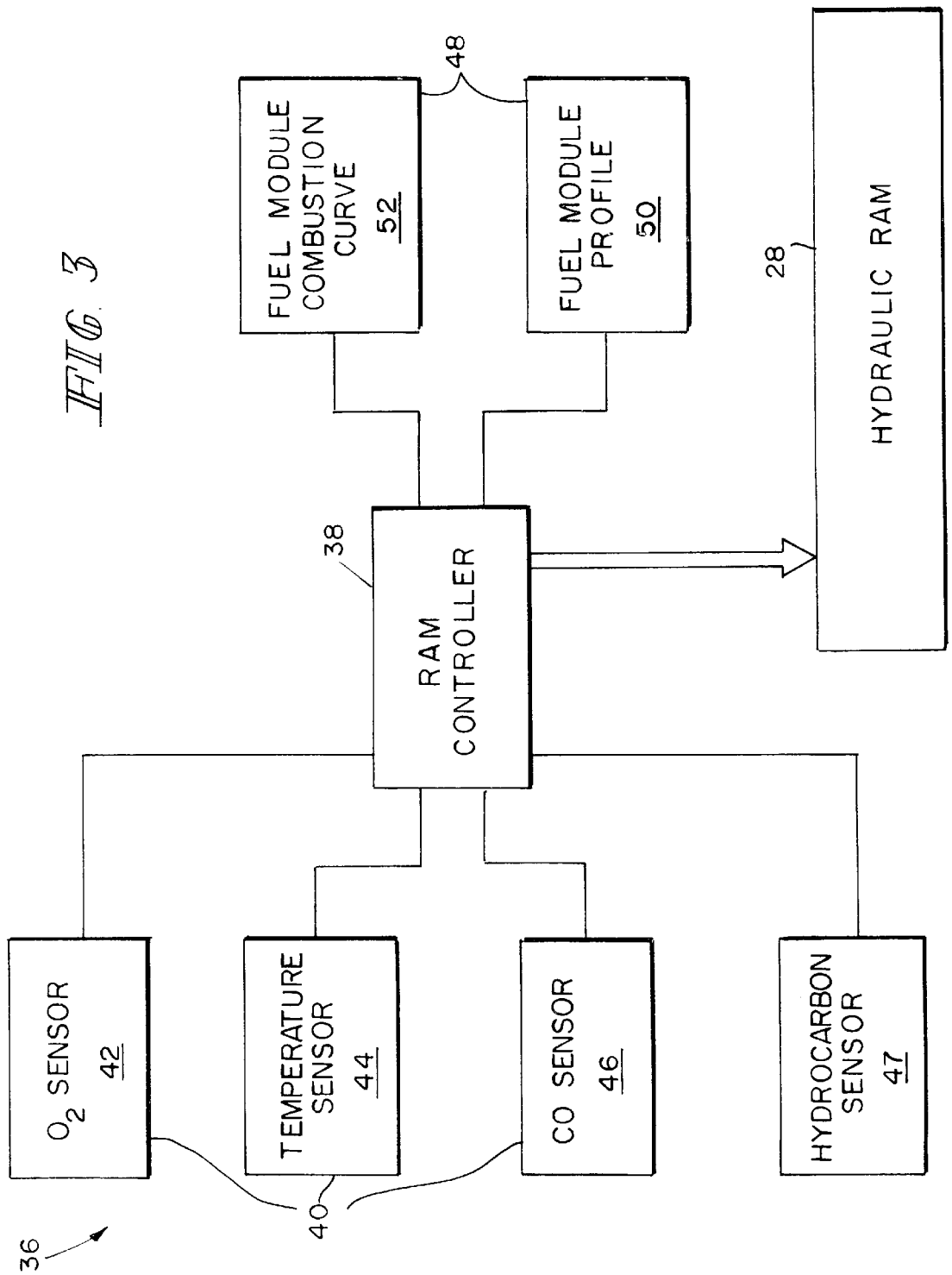
FIG. 3 is a diagram of the control system for the fuel feeder.

To control combustion of fuel module 11 as it is advanced through fuel inlet 22, fuel charging apparatus 10 includes a control system 36 that controls the rate at which the fuel module 11 is advanced into riser duct 12 by ram 28. As shown in FIGS. 1 and 3, control system 36 includes a ram controller 38 and one or more sensors 40 in communication with ram controller 38 to provide ram controller 38 with signals indicative of the burning efficiency within the riser duct. Sensors 40 are positioned in riser duct 12 wall near fuel inlet port 22 to sense conditions near the location of fuel module introduction. Alternatively, the sensors 40 can be positioned downstream of the fuel inlet port 22. Sensors 40 can include an oxygen sensor 42, a temperature sensor 44, a carbon monoxide sensor 46, or a hydrocarbon sensor 47. Any combination of such sensors or other sensors can be used to provide signals corresponding to the sensed environment within the riser duct.

Ram controller 38 can also be programmed to include data corresponding to fuel module characteristics 48. Module characteristics 48 include relevant data regarding the physical shape or combustion characteristic profile 50 of the fuel module 11 and a combustion calibration curve 52 of the fuel module 11. Ram controller 38 is in communication with hydraulic ram 28 and controls the rate of extension for hydraulic ram 28 and thus the rate of advancement of the fuel module 11 through fuel inlet port 22 for contact with the high temperature kiln gases in the riser duct 12.

The fuel advancement rate is calculated as a function of the signals from sensors 40 and the fuel module characteristics 48. The extension rate can be varied as the fuel module 11 is advanced through port 22 into riser duct 12. Such a varied extension rate is important, for example, if the fuel module 11 has a non-uniform shape, cross-section, profile, or composition. By considering fuel module characteristics 48, ram controller 38 may vary the extension rate of hydraulic rain 28 responsive to the characteristics of the fuel module 11 and/or the signals received from sensors 40.

In preferred embodiments, a combustion control agent 49 is used to modulate the combustion or pyrolysis of the fuel module 11 and to reduce build up of deposits in the riser duct 12. In the illustrated embodiment, the control agent is meal 49, the raw material used in the making of Portland cement. The meal 49 is blown into riser duct 12 through meal inlet 24 in the proximity of fuel inlet port 22. The meal 49 is collected from cyclones (not shown) and stored in a cyclone collector 54. Cyclone collector 54 is connected to narrowed segment 18 of riser duct 12 at meal inlet 24 via a meal feed line 56. A blower 58 is provided to blow the meal 49 into riser duct 12 so that the meal 49 is finely dispersed within riser duct 12 in the vicinity of fuel inlet port 22.

As shown in FIG. 1, in one preferred embodiment of the invention, the riser duct 12 above shelf transition portion 16 is narrowed at riser duct segment 18 to create a pressure differential resulting in increased kiln gas velocity through narrowed riser duct segment 18. The first, second, and third portions 17, 18, 20, respectively, of riser duct 12 are each designed to have different cross-sectional areas (in cross-section transverse to longitudinal axis 21). The cross-sectional area of the first portion 17 is greater than the cross-sectional area of the second portion 18 and the cross-sectional area of the second portion 18 is greater than the cross-sectional area of the third portion 20. This structure of riser duct 12 increases gas velocity through riser duct 12 to suspend the meal 49 in riser duct 12. Meal inlet 24 of riser duct 12 can be located anywhere in riser duct 12, but most preferably proximal to fuel inlet port 22.

The meal is finely ground particulate matter and as such provides two important functions when blown into the riser duct proximal to fuel charging apparatus 10. Firstly, the introduction of meal provides a very large surface area which works to cool the proximal area of riser duct 12 to slow the rate of combustion or pyrolysis of fuel module 11. Secondly, the meal particles bond to any pyrolyzed fuel thus helping to prevent build-up of pyrolyzed fuel on the walls of riser duct 12. By increasing the kiln gas velocity, the meal is picked up and carried upwardly through riser duct 12 along with any pyrolyzed fuel providing more opportunity to prevent build-up of fuel deposits on the walls of the riser duct 12. In preferred embodiments, the meal 49 is introduced into the riser duct by blower 58 to finely disperse the meal 49 within riser duct 12. In preferred embodiments, the meal 49 is preheated as it is collected by cyclone collector 54 from cyclones upstream of fuel charger apparatus 10. While preheated meal is preferred, in alternative embodiments, raw unheated meal or kiln dust can be utilized. In alternative embodiments, a control agent is not required.

In preferred embodiments, the meal 49 is introduced into riser duct 12 at a continuous rate and the ram controller 38 accounts for this continuous rate of meal introduction when determining the rate of advancement of ram 28. In alternative embodiments, the ram controller may control the rate of advancement of the ram and the rate of meal feed based on factors such as the fuel module characteristics and the sensed conditions within the riser duct.

The control system 36 is a programmable microprocessor capable of receiving digital or analog signals from sensors 40 and capable of delivering signals via electrical communication or telemetry to the fuel feed mechanism 28 for adjusting the rate of advancement of the fuel module 11 through the fuel delivery port 22 in the riser duct 12. In alternative embodiments, the controller is also capable of receiving and discriminating signals indicative of the feed rate of the control agent. In yet another alternative embodiment, the controller also controls and adjusts the feed rate of the control agent in conjunction with determining the feed rate of the fuel module.

The control system 36 interfaces with the ram or any other type of mechanical advancing system 28 to feed the fuel module 11 into the riser duct 12 at a rate whereby fuel module burning efficiency is optimized with concomitant benefit to effluent gas stream quality. The fuel module 11 is combusted or pyrolyzed as it is advanced through port 22. The last portion of the fuel module 11 advanced through port 22 may fall down through the riser duct 12 onto the shelf transition portion 16.

Figure 4:
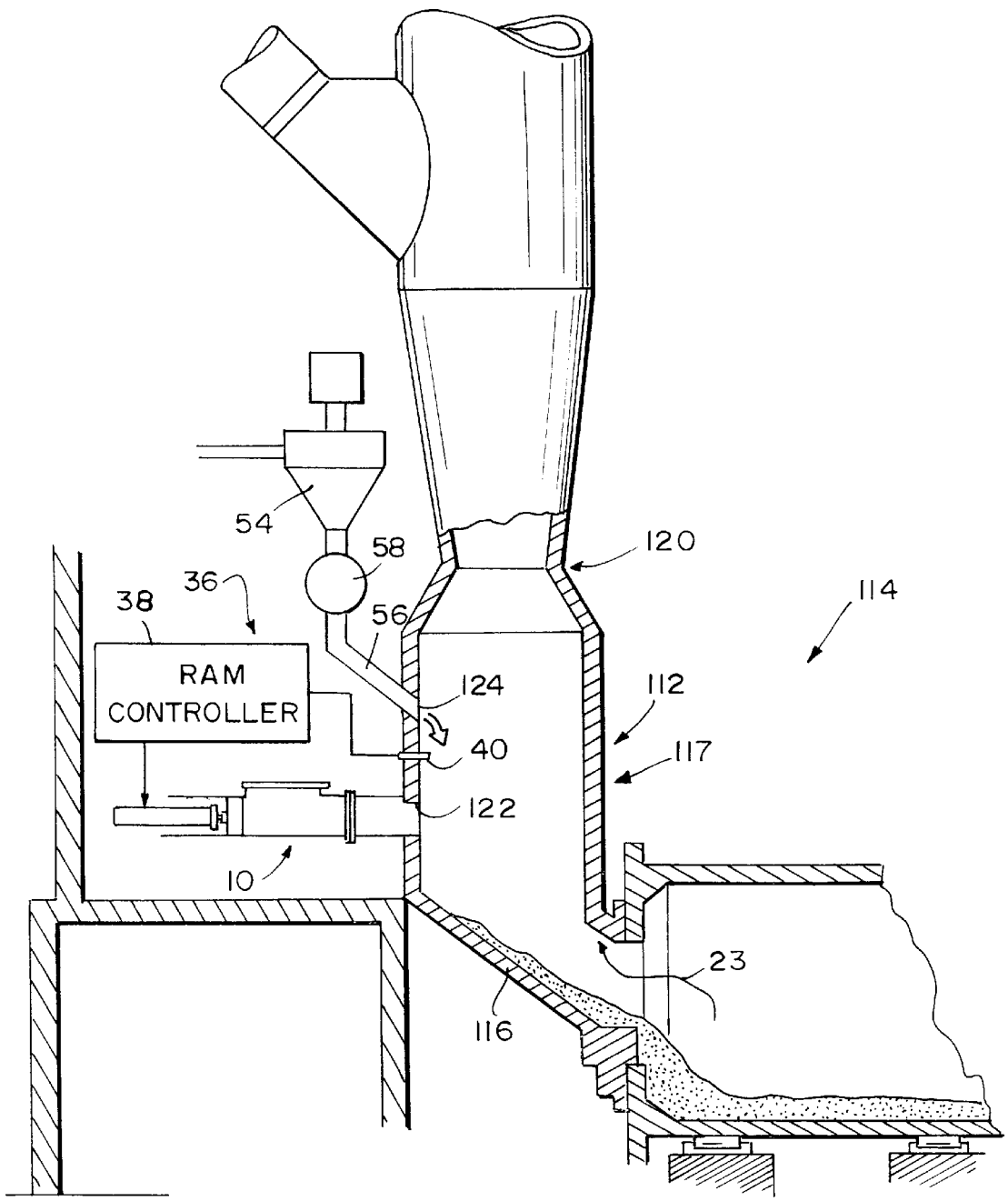
FIG. 4 is similar to FIG. 1 showing an alternative embodiment of the invention.
Figure 5:
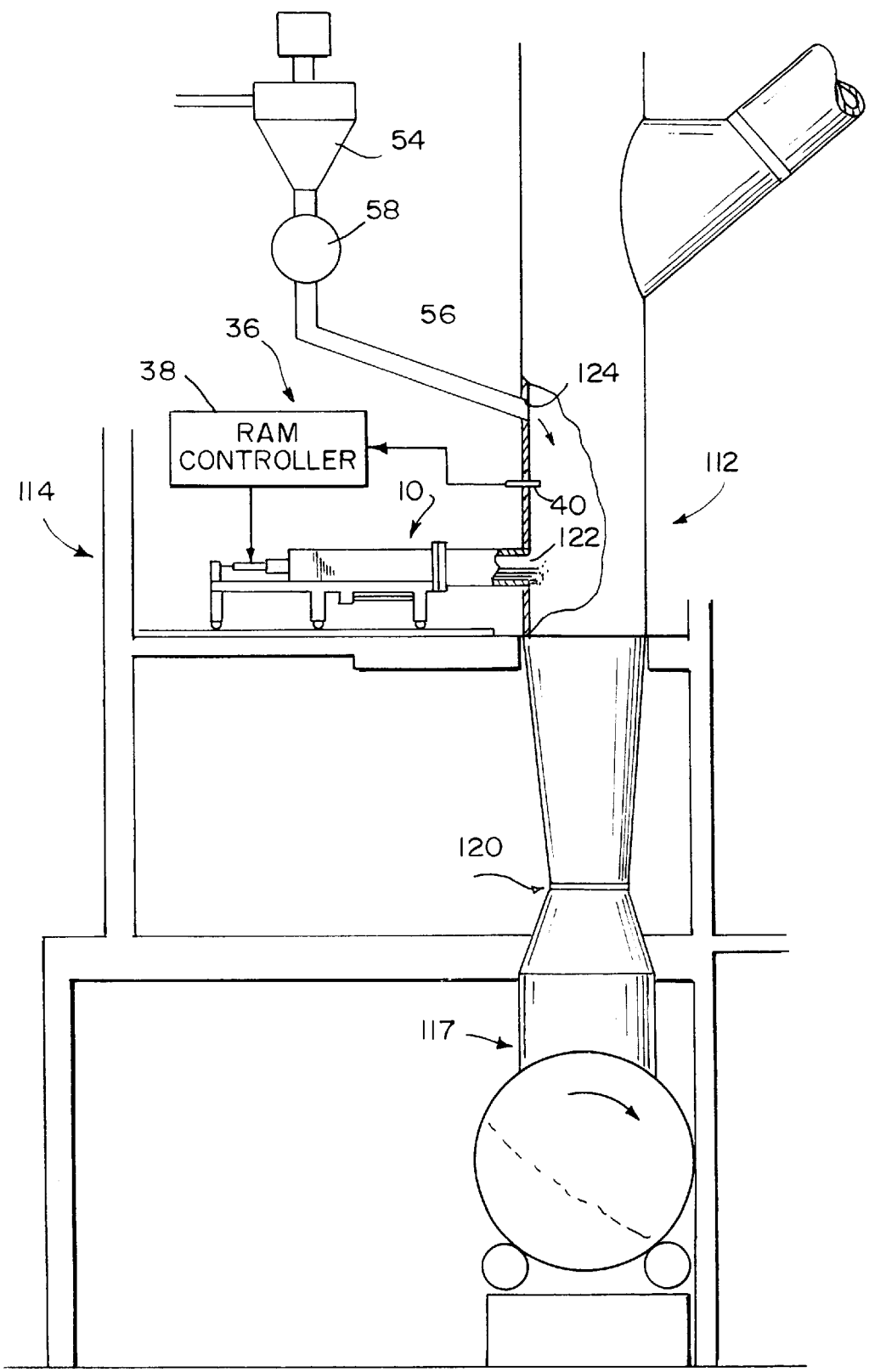
FIG. 5 is an end-view of a kiln modified with an apparatus of the invention.
Figure 6:
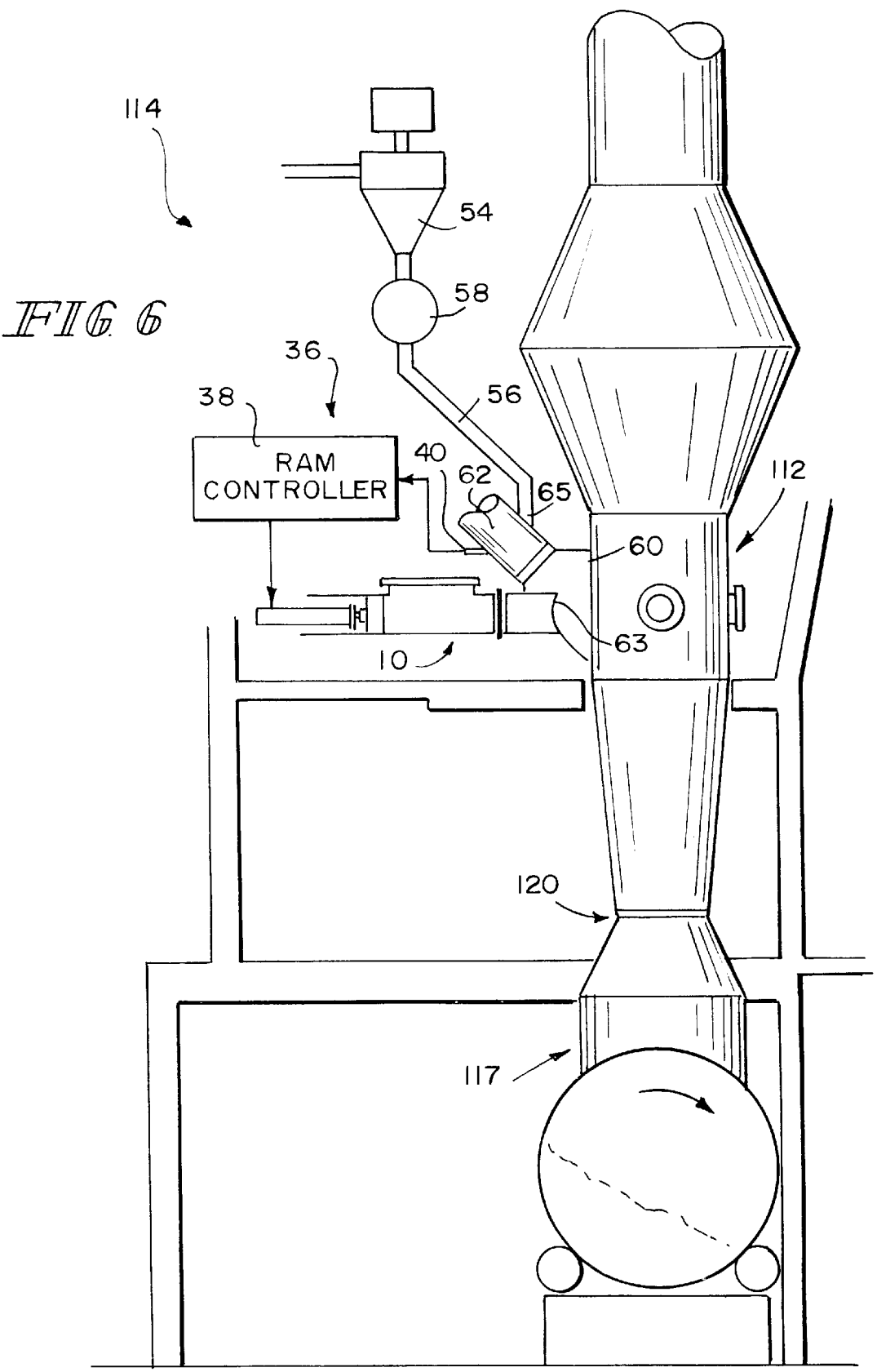
FIG. 6 is similar to FIG. 5 showing an alternate embodiment of the invention.

Fuel charging apparatus 10 may also be used with a riser duct 112 of a preheater or precalciner kiln 114 as shown in FIG. 4–6. A difference between riser ducts 12, 112 is that riser duct 112 does not include the narrowed segment 18 of riser duct 12. Riser duct 112 includes a first portion 117 positioned above shelf transition portion 116 and an orifice or second portion 118 positioned above first portion 117. The first portion 117 and orifice 118 of riser duct 112 are substantially similar to first portion 17 and orifice 18 of riser duct 12. Riser duct 112 is commonly found in the industry in current preheater/precalciner kiln applications and may be modified to receive fuel modules 11 and meal 49.

Because riser duct 112 does not include a portion similar to narrowed segment 18 of riser duct 12, it is possible that kiln gas velocity in riser duct 112 will not be high enough in the region below orifice 120 to carry meal 49 upwardly through riser duct 112. Thus, riser duct 112 includes a meal inlet 124 positioned directly above a fuel inlet 122 to allow meal 49 to fall downwardly through riser duct 112 towards the combusting or pyrolyzing fuel module 11.

FIGS. 4–6 show three different locations for the introduction of fuel modules 11 and meal 49 into kiln 114. In FIG. 4, the fuel inlet 122 and meal inlet 124 are positioned below orifice 120. In preferred embodiments of operation, the fuel modules 11 are pyrolyzed rather than combusted when introduced at the location shown in FIG. 4 due to low oxygen content of the kiln gases at that point in the kiln. Fuel inlet 122 and meal inlet 124 of riser duct 112 may also be positioned above orifice 120 as shown in FIG. 5.

Fuel charging apparatus 10 may also be positioned adjacent to a tertiary air duct 62 of kiln 112 as shown in FIG. 6. Riser duct 112 includes a tertiary air inlet 60 and tertiary air duct 62 is coupled to tertiary air inlet 60 to provide heated gas to riser duct 112 to further aid combustion. Tertiary air duct 62 includes a fuel inlet 63 near riser duct 12 and a meal inlet 65 positioned above the fuel inlet 63. Tertiary air duct 62 introduces oxygen (air) into the riser duct 12 which results in combustion of fuel module 11 as it is introduced into the tertiary air duct 62 at the location shown in FIG. 6.

In the illustrated embodiments of the invention, only one fuel charger apparatus 10 is provided in riser duct 12, 112 and tertiary air duct 62. In alternative embodiments, multiple fuel charger apparatuses may be situated in a riser duct and/or tertiary air duct to provide equal distribution of fuel in the riser duct for optimum fuel/oxygen mixing. Although the invention has been described and defined in detail with reference to certain preferred embodiments, variations and modifications exist within the scope and spirit of the invention as described herein.

What is claimed is:

1. In an apparatus for delivering solid waste derived supplemental fuel elements into a preheater or precalciner cement kiln having a riser duct, a rotary vessel, a shelf-transition portion and a kiln gas stream comprising combustion products flowing serially from said rotary vessel through the shelf-transition portion and into said riser duct, said apparatus comprising a supplemental fuel delivery port in said riser duct spaced apart downstream, relative to kiln gas flow, from the transition shelf portion, a fuel delivery tube having a fuel inlet end external to the riser duct and a fuel outlet end spaced apart from the inlet end and communicating with the fuel delivery port, and a solid fuel feed mechanism for advancing solid fuel elements through the fuel delivery tube and the fuel delivery port, the improvement comprising a controller for the feed mechanism for adjusting the rate of advancement of the solid fuel element through the fuel delivery port and into contact with the kiln gas stream.

2. The improved apparatus of claim 1, wherein the apparatus further comprises a sensor in contact with the kiln gas stream and in communication with the electrical or telemetric controller for providing signals indicative of the combustion efficiency in the kiln.

3. The improved apparatus of claim 2, wherein the sensor provides a signal indicative of the concentration of a gaseous component of the kiln gas stream said component selected from the group consisting of oxygen, carbon monoxide, hydrocarbons, and nitrogen oxides.

4. The improved apparatus of claim 2, wherein the controller is programmed to increase the rate of advancement of the solid fuel element through the fuel delivery port in response to sensed increases in oxygen or nitrogen oxide concentration.

5. The improved apparatus of claim 2, wherein the controller is programmed to decrease the rate of advancement of the solid fuel element through the fuel delivery port. in response to sensed increases in carbon monoxide or hydrocarbon concentration.

6. The improved apparatus of claim 1, wherein the apparatus is free of any supports for the fuel module after it is advanced through the fuel delivery port.

7. The improved apparatus of claim 1 further comprising a mealdust delivery port in the riser duct independent of the fuel delivery port and a blower for dispersing meal or kiln dust into the kiln gas stream.

8. A preheater or precalciner kiln modified to include the improved apparatus of claim 1.

9. A method for optimizing the use of supplement solid fuels in a preheater or precalciner kiln while minimizing the impact of such use on effluent kiln gas quality, said method comprising the steps of modifying a preheater or precalciner kiln to include the improved apparatus of claim 1 and operating the modified kiln to minimize concentrations of carbon monoxide, hydrocarbons, and nitrogen oxides in the effluent kiln gas stream.

10. A method for controlling the feed rate of a fuel module into a combustion region, the method comprising the steps of determining the status of the combustion region, determining the physical characteristics of the fuel module, and considering the status of the combustion region and the physical characteristics of the fuel module to control the feed rate of the fuel module.

11. The method of claim 10, wherein the step of determining the status of the combustion region includes measuring the oxygen level of at least one of the combustion region or a location where the oxygen level of the combustion region can be determined.

12. The method of claim 10, wherein the step of determining the status of the combustion region includes measuring the carbon monoxide level of at least one of the combustion region or a location where the carbon monoxide level of the combustion region can be determined.

13. The method of claim 10, wherein the step of determining the status of the combustion region includes measuring the temperature level of at least one of the combustion region or a location where the temperature level of the combustion region can be determined.

14. The method of claim 10, wherein the step of determining the physical characteristics of the fuel module includes measuring at least one of the physical size, shape, and profile of the fuel module.

15. The method of claim 10, wherein the step of determining the physical characteristics of the fuel module includes measuring the combustion characteristics of the fuel module.

16. The method of claim 10, further comprising the steps of feeding a control agent into the combustion region to affect the combustion and accounting for the control agent when determining the feed rate of the fuel module.

17. The method of claim 16, further comprising the step of controlling the feed rate of the control agent in conjunction with the step of determining the feed rate of the fuel module.

18. A mechanism used to feed fuel modules into a combustion region, the mechanism comprising a fuel module feeder, a sensor positioned in communication with the combustion region, and means for considering measurements of the sensor and physical characteristics of the fuel module to control the rate at which the fuel module feeder feeds fuel modules into the combustion region.

19. The mechanism of claim 18, further comprising a control agent feeder adapted to feed a control agent into the combustion region to affect combustion in the combustion region.

20. The mechanism of claim 19, wherein the control agent feeder provides control agent to the combustion region at a continuous control agent feed rate and the considering means includes means for accounting for the continuous control agent feed rate when controlling the rate at which the fuel module feeder feeds fuel modules into the combustion region.

21. The mechanism of claim 19, wherein the considering means further includes means for adjusting the feed rate of the control agent in conjunction with controlling the rate at which the fuel module feeder feeds fuel modules into the combustion region.

* * * * *